United States Patent
Carr

(10) Patent No.: US 9,805,375 B1
(45) Date of Patent: Oct. 31, 2017

(54) CONTENT-BASED PRICE REDUCTIONS AND INCENTIVES

(75) Inventor: William D. Carr, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1383 days.

(21) Appl. No.: 12/507,007

(22) Filed: Jul. 21, 2009

(51) Int. Cl.
*G06Q 30/02* (2012.01)

(52) U.S. Cl.
CPC .................... *G06Q 30/02* (2013.01)

(58) Field of Classification Search
CPC .............. G06Q 30/02; H04N 21/45
USPC .... 715/748; 705/14.45, 14.68, 14.41, 14.51; 707/5, E17.014; 725/46
See application file for complete search history.

(56) References Cited

U.S. PATENT DOCUMENTS

| 2002/0143636 A1* | 10/2002 | Carignani ........................ 705/26 |
| 2003/0149618 A1* | 8/2003 | Sender et al. .................... 705/14 |
| 2006/0059055 A1* | 3/2006 | Lin ................................. 705/26 |
| 2009/0018909 A1* | 1/2009 | Grecia ............................ 705/14 |

* cited by examiner

*Primary Examiner* — Sun Li
(74) *Attorney, Agent, or Firm* — Hogan Lovells US LLP

(57) ABSTRACT

Customers in an electronic environment can be presented with the option to receive advertising, such as audio, video, or interactive content, in order to receive discounted pricing or similar benefits. In one embodiment, a customer can select to watch a video advertisement on a detail page for an item, and the displayed price for the item will be shown to decrease as the customer continues to watch the video. Such an approach enables the provider to obtain additional revenue from the advertisement, which can offset any loss or reduction in price of the item. Revenue can be generated in other ways using these ads, such as by displaying advertisements that will enable a customer to obtain lower prices on other items, such as accessories or services relating to an item that is determined to be of little or no profit for the provider.

21 Claims, 9 Drawing Sheets

CONTENT-BASED PRICE REDUCTIONS AND INCENTIVES

BACKGROUND

As the number of users viewing information and purchasing items electronically increases, there is increasing competition for customers in not only traditional shopping channels, such as physical "brick and mortar" stores and catalog-based shopping, but in ever-expanding electronic environments as well. Additional challenges exist for retailers or providers in these electronic environments, however, as many traditional advertising and promotional approaches do not work as effectively as in physical locations such as retail stores. For example, when an item that is expected to be popular is first placed on sale, many retailers will offer the item at a reduced or promotional price that will attract customers to purchase that item from that particular retailer. In many cases the price will be a "loss leader," or a promotion for which the retailer may actually lose money on the sale of the item. Part of the reason for selling the item at a loss, or at least for little or no profit, is that once a customer takes the time, effort, and expense to travel to a physical store, the customer will likely pick up one or more items while the customer is at the store. Thus, the retailer is likely to make a profit on the average transaction including that item. Or, at least, some of those customers will become regular customers and will be more likely to make subsequent profitable purchases at that location.

Promotions such as "loss leaders" do not generally work the same way in an electronic environment. An electronic retailer often will have to substantially match the prices offered by physical retail stores in order to entice customers to purchase from the retailer (with some allowance possible for savings related to travel, convenience, etc.). Because there is no real cost for the customer to visit an electronic marketplace, however, customers often visit a site just to purchase a specific loss-leader item without bundling additional items into the order. Often, a customer will just visit a site to check out a price or view information for a specific item. In each of these cases, the electronic retailer will either lose money on the transaction, or at least have to accept the cost of resources to provide information to customers who do not actually end up purchasing or otherwise consuming the item, service, subscription, etc.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to providing promotions, advertising, or other such supplemental content in an electronic environment. Approaches are provided for offering supplemental content, such as video or audio advertising, which allow a customer to obtain a lower price for an item or service upon receiving at least a portion of the content. Such an approach also allows a provider to monetize through both selling an item and presenting advertising or other supplemental content to a customer, which can help to offset any loss or reduction in profit due to price matching competition or otherwise dropping the price of an items offered for consumption. Such an approach also helps to monetize traffic, and offset the costs of providing content to customers who do not make purchases, as pages with heavy traffic can result in many impressions (or views) for a given ad. Such an approach differs from standard broadcast advertising in a number of ways, at least in the fact that the customer has the option of receiving the advertising content, and the advertising content can be determined dynamically based on a number of different factors. Further, the advertising can cause the price to be reduced for specific items based upon the amount of advertising presented to a customer.

Figure 1:
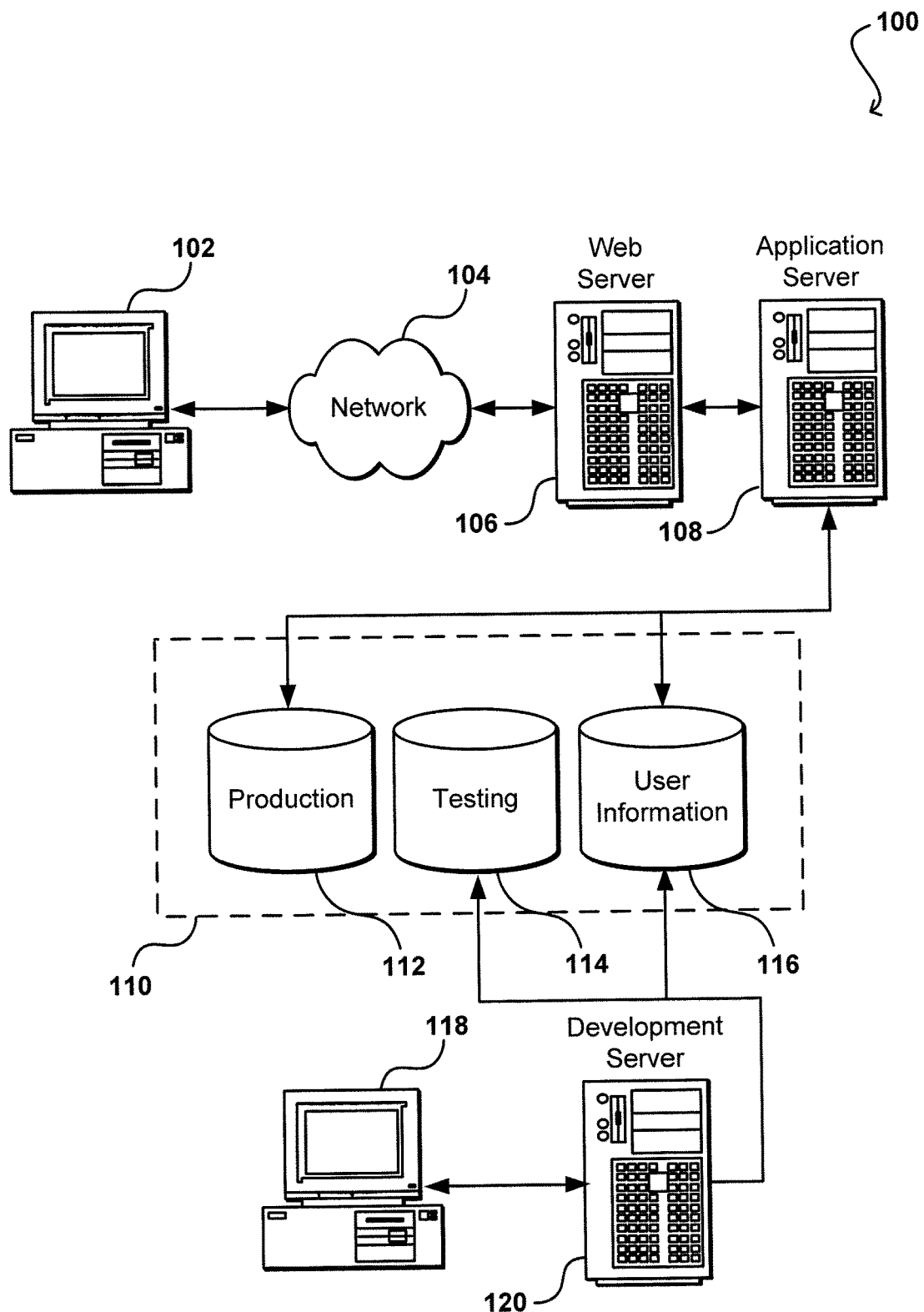
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
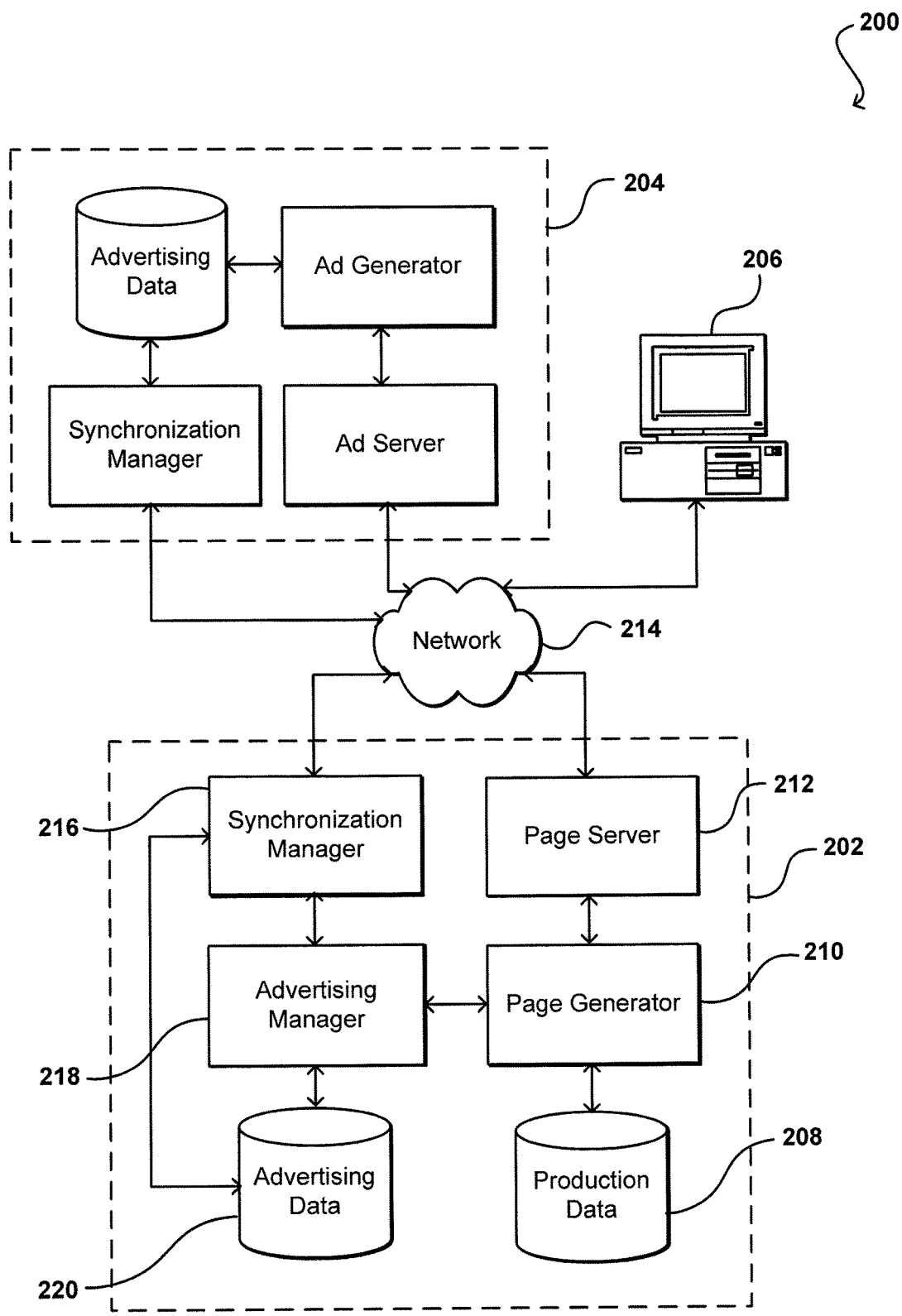
FIG. 2 illustrates components for determining aspects of advertisements to provide to a separate provider that can be used in accordance with one embodiment.

An environment such as that illustrated in FIG. 1 can be useful for a content provider such as a provider of an electronic marketplace, wherein multiple associates or other content providers might wish to advertise or otherwise display supplemental content on pages for the marketplace itself, in addition to ads from the provider of the marketplace. The electronic environment in such a case might include additional components and/or other arrangements, such as those illustrated in the configuration 200 of FIG. 2. In this example, a content provider 202 can receive supplemental content comprising various advertising information from at least one advertising entity 204. In certain embodiments, the advertising entity can be affiliated with, or part of, an electronic retailer providing an electronic marketplace, while in other embodiments the advertising entity can be a separate or third party provider. Components of the advertising entity 204 and the content provider 202 can each provide information useful for advertising, such as keyword-landing page pairs, creative elements, ad selection, and bid prices.

In this example, the content provider 202 generates and serves pages of content available to any appropriate end user 206, and thus can include components such as a production data store 208 that can be used by a page generator 210 to generate pages that can be served by a page server 212 (such as a Web server in a Web-based environment) over a network 214 to the end user 206. Similarly, any other appropriate provider 204 can include components such as ad generator and ad server components for generating and serving advertisements to a user. While many of the embodiments are described with respect to a Web-based environment, it should be understood that pages are not limited to Web pages, but can include any application page or other interface page that can be displayed or otherwise conveyed to a user.

If the advertising entity 204 wishes to advertise with the provider 202 using sponsored links or other advertisements that direct a user back to a page provided by the advertising entity, the advertising entity also can include components for determining the landing pages to be associated with the advertisements. While the advertising components in this example are shown to be part of the advertiser's system, it should be understood that these components can be part of a separate system or provided as a third party service, for example. In this example, the content provider system includes an advertising manager 218, which can encompass, monitor, and/or control a number of different algorithms and components for selecting and deciding upon pages on which to display ads, as well as dynamically determining when to show certain ads and selecting appropriate ads to show for each category, classes of users, specific items, etc. When the advertising manager 218 decides on an advertisement to be associated with content on the provider pages, the advertising manager 218 can store the advertising data to an advertising data store 220, which in some embodiments can comprise separate tables in the production data store 208. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The content provider system also can include a synchronization manager 216 that can work with a synchronization component of the advertiser 204 to periodically synchronize the advertising data with the advertising data stored at the provider 202, such that the appropriate landing pages, creative content, and financial information can be designated and updated as desired. When a user 206 views a page of content served by the provider 202, the page can include an advertisement that can in some instances direct the user to a page of the advertising entity 204 upon selection by the user. In other cases, the user 206 can be directed to a page of content from the content provider 202 that relates to the advertisement. In other cases, the content provider might credit the user or offer the user a promotion in exchange for watching the advertisement from the advertiser, which can relate to a product or service offered by the advertiser.

Figure 3:
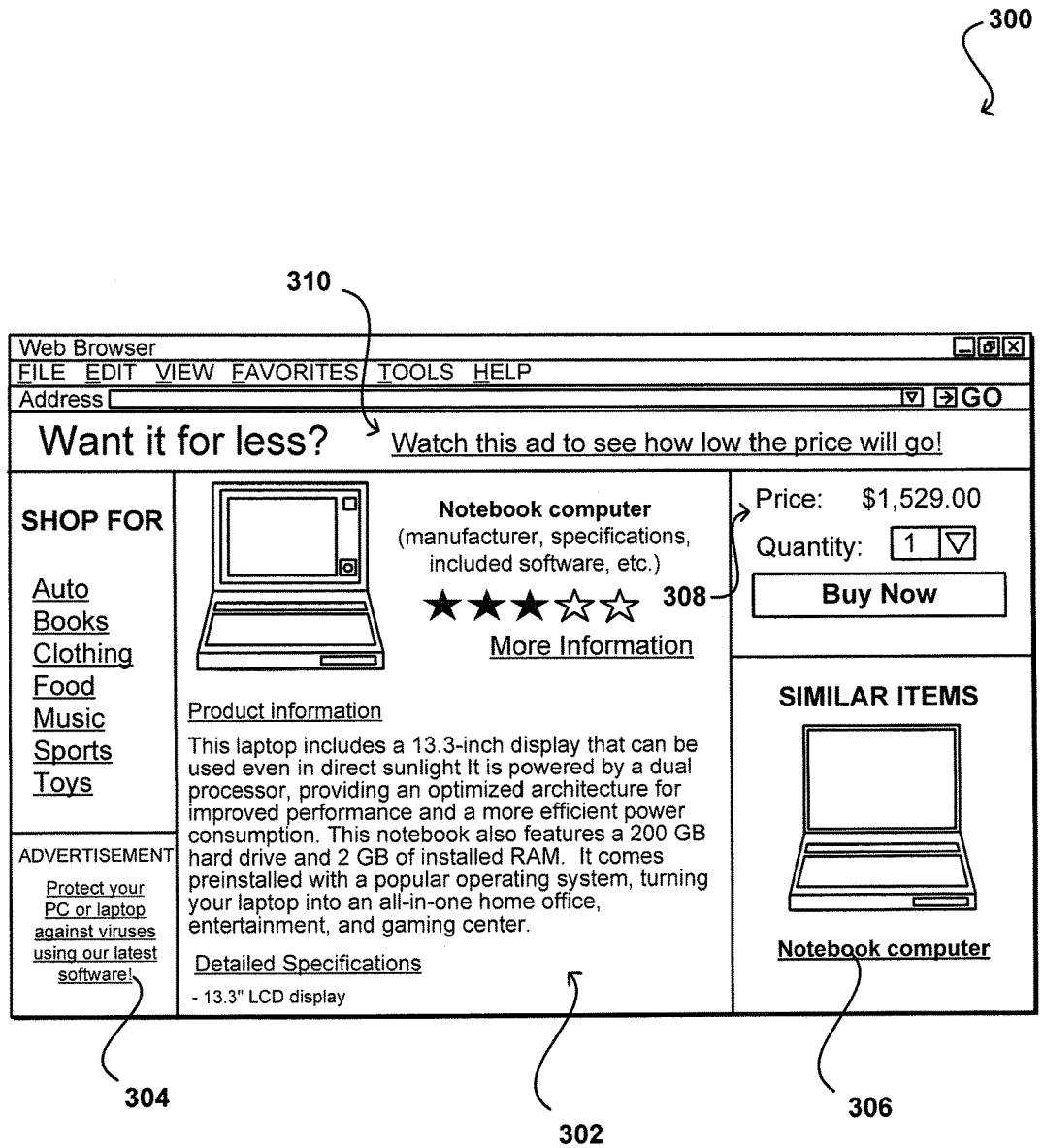
FIG. 3 illustrates an example interface including a link to view a video advertisement in accordance with one embodiment.

When a user accesses a page, document, or other piece or grouping of content from the content provider, such as an item detail page 300 for a particular item offered through an electronic marketplace as illustrated in FIG. 3, several advertisements might be displayed. This example illustrates a Web page for an electronic marketplace displayed in a browser application, wherein the Web page includes information 302 for an item being viewed by a customer. It should be understood that the term "customer" as used herein refers to a user browsing information or content, and is not meant to imply a purchase or relationship to the provider of the content. The example page also includes a sponsored link 306 that directs a customer to another portion of the site when selected, and another sponsored link 304 that directs the customer to a site of a third party advertiser. Sponsored links can be selected based on any appropriate factor, such as content of a page, a keyword used to navigate to that page, etc. Sponsored links also can be displayed on any other appropriate interface capable of following a link or similar navigational element to another source of information, and as such the term "link" will be used for purposes of explanation but should not be interpreted as limiting the types of navigational elements that can be used with various embodiments.

As discussed above, sometimes the item displayed on the page will be offered at a price that results in little to no profit, or sometimes even a loss, for the electronic retailer. In such cases, it can be desirable to minimize any loss, or increase the overall profit that would result from such a transaction. As illustrated, advertisements can be placed on the page to attempt to generate additional revenue from the page. For ads such as sponsored advertisements, however, there may be little incentive for the customer to actually select or "click" on the ad. If the customer does not select the sponsored ad, no revenue is generated. Even if the customer does click on the ad, however, the customer typically will be directed to a third party site, which can decrease the likelihood of a customer purchasing the item even if the third party site is opened in a separate window or other such instance.

Systems and methods in accordance with various embodiments can attempt to generate revenue in these and other such circumstances by providing a customer with an option to view, listen to, interact with, or participate in specific supplemental content, such as advertising or third-party content. In many embodiments, a customer submitting a request for content relating to an item or service can be enticed to select to receive the supplemental content by offering a reduction in the price of the item or service offered for consumption. For purposes of simplicity, various embodiments will be described with respect to a customer purchasing an item through a Web site, for example, but it should be understood that any type of item or service that can be offered for consumption (purchase, lease, rent, etc.) through an electronic channel can be used with various embodiments as well, and the examples should not be interpreted as limiting the scope of the various embodiments. The supplemental content will be discussed using the example of advertising, but it should be understood that any appropriate supplemental content can be utilized as should be apparent from the teachings and suggestions contained herein. Also, examples will be described with respect to an electronic retailer or electronic merchant, but it should be understood that an item or service can be offered by any appropriate provider in the given context. As used herein, the term "item" can refer to anything that can be ordered, purchased, rented, used, or otherwise consumed and/or accessed via a network request or electronic submission, such as a product, service, or system. A request can include any appropriate request sent over an appropriate system or network, such as a request submitted to a Web page over the Internet or a message sent via a messaging system to a content provider, for example.

For example, the display 300 of FIG. 3 illustrates information 302 for an item that will result in a specific amount of profit for the merchant offering the item if the item is purchased. Based on criteria or otherwise selected as discussed elsewhere herein, the example display also includes an option 310 to view a video advertisement. In this example, the option is an "above the fold" hyperlink that, when followed by the customer, will cause a video to be played in a frame, window, panel, or other appropriate location on the screen. The link here includes text that entices a customer to follow the link, such as may indicate to the customer that the price of the item will be reduced upon the customer viewing the advertisement. In some cases the above-the-fold text (or other text or elements on the page) can indicate to the customer what the reduced price may be, while in other instances the customer must view at least a portion of the video to see the final price.

Figure 4A:
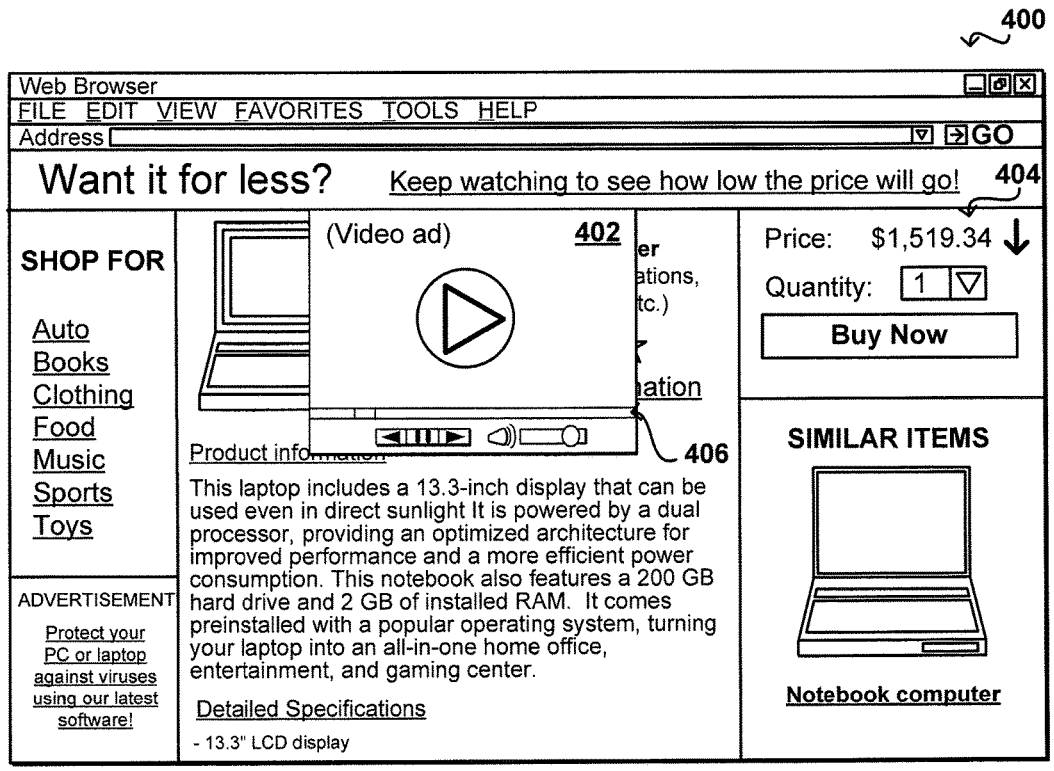
FIGS. 4(a) and 4(b) illustrate an example of a price reduction corresponding to a video advertisement in accordance with one embodiment.

The display 400 in FIG. 4(a) illustrates an example of a video advertisement 402 that can be displayed upon a customer selecting an option to view the advertisement. The video can be any appropriate video advertisement in any appropriate format, such as a "pre-roll" video advertisement in an MPEG, AVI, or similar format. In this embodiment, the video will play over top of (or "overlay") the page, such that the customer can move the video around in order to view other information on the page. While in some cases the video may play in a separate window or tab, in some embodiments the video plays in a modal window, or other element tied to the page, such that a customer cannot simply minimize or otherwise hide the advertisement while the ad is playing (unless the customer also hides the entire page, etc.). In several embodiments, the displayed price that is associated with the item will also change as the video plays. For example, the price 404 shown in this figure is less than the price displayed for the same item in FIG. 3. In some embodiments, the price will drop substantially continually while the customer views the advertisement. In other embodiments, the price will drop in steps (e.g., $0.05, $0.10, $0.25, $1.00 or other such increments) periodically throughout the video. In this way, a customer can watch as much (or as little) of the video as the customer wants, or until the customer receives the price that the customer is willing to pay for the item. In embodiments where a transport bar 406 shows how much of the video has been viewed versus the overall length of the video, customers can gauge how much discount might be possible for the remaining portion of the video, and can be enticed to continue watching or can determine that the additional discount is not worth the additional viewing time. In other embodiments, there is only a single price drop that occurs at the end of the video, at the end of a segment of the video, or at any other appropriate time. Still other fixed or variable pricing adjustments are possible within the scope of the various embodiments.

Figure 4B:
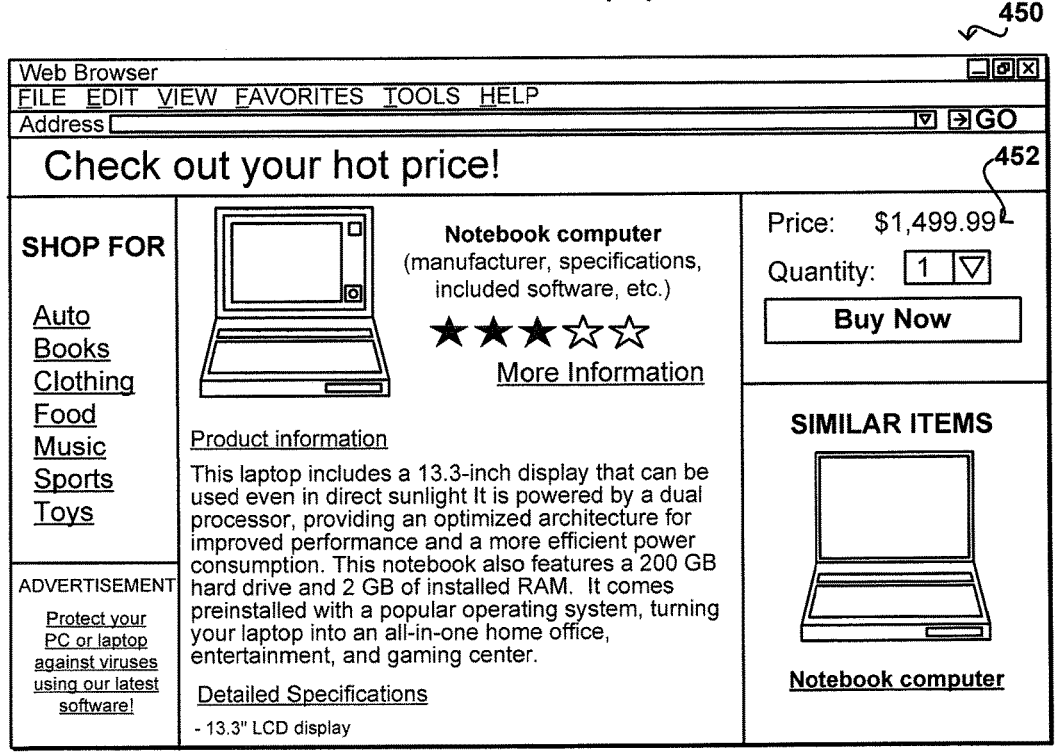

FIG. 4(b) illustrates a state of the display 450 after the customer has finished the video ad. In this example, the video window (or other display) is no longer visible, and the price 452 is shown to be the lower price for this item. If still further decreases are possible, other ad offers can be displayed. If this is the lowest price, then a message indicating the final price can be displayed. An icon or other graphical element can be displayed that indicates the lower price has been obtained. Several other types of display are possible within the scope of the various embodiments.

There can be several ways in which a customer can select to view an advertisement that results in a decrease in the offer price. As discussed above, a customer can select to view a specific ad for a specific item, where that ad is available to all customers. In other embodiments, a customer might belong to a specific group of users that receives video ads in order to receive lower prices or otherwise obtain additional information. In other embodiments, a customer might set preference information indicating whether the customer wishes to view video ads. For example, a customer might specify that the customer is always willing to view ads in order to receive the lowest price. In such case, the video ads might always display automatically when the customer accesses a page with a video ad. In other cases, a customer might specify to only show ads in specific categories, or to only automatically play ads in specific categories or for certain types of pages. For example, a customer might wish to automatically view ads for electronics, where the savings is likely to be relatively high and the customer might visit only when the customer is looking for something specific. Similarly, the customer might select not to automatically view video ads for books or music, which the customer might view quite often and which could significantly slow the browsing process if a video ad were to be loaded and played for each such page. In other cases, a customer might select to never even see the options for video ads, and instead to use the area of the page to provide other types of information.

Approaches in some embodiments also must account for local rules and regulations. For example, "price discrimination" or similar laws can prevent a retailer from offering different prices to different customers, such as may be based upon how much a customer spends on average or in total, etc. Thus, in some embodiments it can be desirable to ensure that all customers have the ability to obtain the lower price. Other options can exist, however, such as offering the ability to display ads to customers who join certain programs or satisfy some other appropriate criterion that meets all applicable regulations. In some embodiments, part of the decision process to determine whether to show or offer a video ad to a customer can include determining whether the customer fits into one of these criteria, as well as whether the customer has indicated whether or not to receive such an ad.

There also can be a number of criteria or other mechanisms for associating a video ad to be available for a certain page, item, group of customers, etc. In certain embodiments, an estimated value of each item, transaction, or other such aspect is calculated to determine whether to provide an option to display supplemental content. For example, a system in accordance with one embodiment can determine an anticipated profitability or other such financial metric for an item or transaction. If the anticipated profitability for a particular price for an item falls below a specified threshold, percentage, amount, or other such criterion, then the system can offer an ad for all instances of that item offered for that price, at least for a determined period of time. Such process can be done automatically or manually, or a combination of both. For example, if an album or disc of music is coming out for which the retailer will have to offer a loss leading price for the first week, an administrator or other such authorized user can specify that for a week (or other such period of time) a first price should be offered to each customer, along with a second price (or more) based on the customer watching one or more ads. In some cases, this user can also specify the ad, type of ad, class or categorization of ad, or any other aspect of the ad to be offered. If available, the user also can specify which group(s) or type(s) of customer to receive the offer. Various other value determinations can be used as well. For example, various traffic- or use-based metrics can be utilized, such as may include sales volume, sales rate, number of page views, or any other such value. Various other mechanisms for determining when to offer an ad should be apparent to one of ordinary skill in the art in light of the teachings and suggestions contained herein.

Figure 5:
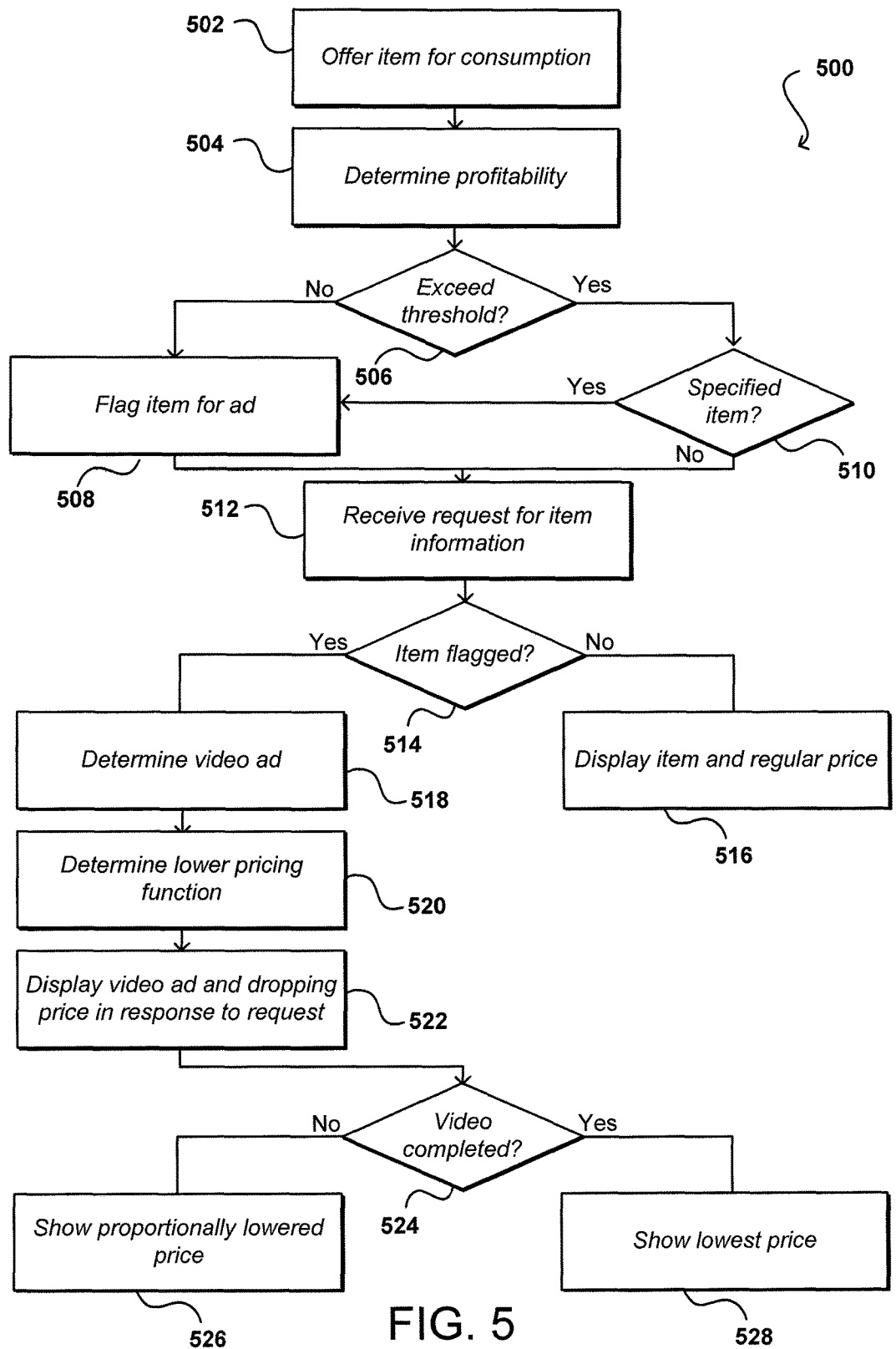
FIG. 5 illustrates a process for reducing item price corresponding to viewing of an advertisement that can be used in accordance with one embodiment.

FIG. 5 illustrates an example of such a process 500 for displaying advertisements for items in accordance with one embodiment. It should be understood that the steps shown are merely examples, and that the order and selection can vary between embodiments. Further, similar processes might utilize fewer or additional steps, and may provide additional, alternative, or lesser functionality. In this process, an electronic retailer or other such provider determines an item to be offered for consumption 502. For each item, a determined profitability can be determined at a specified price point 504. This determination can include any appropriate financial information known or used in the art to determine an anticipated profit to sell an item at a specific price. The price point can also be set using any appropriate determination process, which can include manual and/or automatic processes for analyzing information such as suggested retail price, competitor price, category performance information, etc. A determination can be made as to whether the item at the determined price point meets or exceeds a specified profitability threshold 506. This threshold can include a percentage of the overall cost of the item, an amount of revenue, or any other such parameter. If the item does not at least meet the specified threshold, then the item can be flagged or otherwise have a parameter or indicia set that specifies an advertisement is to be offered along with this item 508. If the item meets or exceeds the threshold, but the item is otherwise determined to be advantageous to have an ad displayed along with the information for the item 510, then the item can be flagged 508 even though the item might result in a profit or minimal loss. For example, new items can be flagged in order to entice customers to try the new items.

Subsequently, a request can be received from a customer for information about the item 512. In some embodiments, this can include a customer requesting a detail page for the item, or submitting a query that would include the item in search results to be displayed to the customer. The system can check to determine whether the item is flagged to have a video ad shown 514. In some embodiments the determination of whether to be shown an ad for an item can be made dynamically for each request, instead of flagging items ahead of time, but such approaches can be at risk for offering different prices to different customers if fluctuating factors are considered.

If the item is not flagged, the information for the item can be displayed along with the standard price 516. If the item is flagged or otherwise designated to have a video or other such ad displayed, then the system can determine an appropriate ad to display 518. In some embodiments a specified ad may be designated to be displayed, while in other embodiments categories or types of ads can be specified, whereby an ad manager or similar component of the system can select an appropriate ad to display. In some embodiments, a number of ads may be rotated or selected based upon the number of ads available, pricing approaches, or any of a number of other such factors. For a flagged item, a lower price and/or lower pricing function also can be determined 520. For example, some items might have only a lower price specified, and the price will decrease in proportion to the amount of the ad which the customer views, or may decrease by the full amount at the end of the video. In other embodiments, a function might be determined which indicates how the price should drop. For example, certain providers or advertisers might want to weight the price reduction such that the price drops mostly at the end (e.g., the price decreases exponentially), or drops somewhat quickly at the beginning (to entice the customer), then slower in the middle, and faster again toward the end. The speed with which the price drops also can vary by type of customer, with certain customers getting to the reduced price faster, as long as all the customers viewing the video can arrive at the same lower price.

The video, audio, interactive game, electronic presentation, or other such advertisement then can be presented, with the reduction in price being displayed over time during presentation of the advertisement 522. As discussed, the ways by which the price can drop can vary by item, user, group, type, or any other such criteria. Once the ad is no longer being presented, such as may be due to the ad finishing or the customer stopping the presentation, a determination can be made as to whether the presentation of the ad completed 524. If so, the lowest price for the item (at least as a result of the presentation of the ad) can be displayed 528. If not, a lowered price that reflects the portion of the ad that was actually presented can be displayed 526. If the customer receiving a reduced price for viewing a portion of the ad instead wants the lowest price, the customer can have the option of finishing the presentation of the ad in order to obtain the lowest price. The customer also can have the option of simply paying the reduced price as a result of watching just a portion of the advertisement.

An advantage to such an approach is that a retailer can offer a price that is lower than a minimum advertised price that is specified by a manufacturer or producer or the item. For example, a manufacturer might specify that an item cannot be advertised for sale for less than $29.99. In such a case, the retailer can advertise the standard price of $29.99, but can offer a "lower" price if the customer receives an ad presentation. This lower price might only be visible after the customer has received at least a portion of the presentation, the item has been added to a virtual shopping cart, or at any other appropriate time.

Another potential advantage to such an approach is that many customers might select to receive a presentation in order to determine the lower price, but might not actually make a purchase of the item at the lower price. In such a situation, the retailer generates revenue by showing the ad to a customer, even though the customer did not actually purchase the item. This further helps to offset the loss or reduced revenue for the item, as there may be many more customers that view the ad than actually purchase the item. For these types of ads, the retailer might generate revenue for each customer that views the ad, such that even though the revenue for an ad typically will not offset the entire amount of the loss for any specific item purchased, the cumulative effect of the overall process might result in little or no loss in total revenue across all items offered at the loss-leading price.

Figure 6:
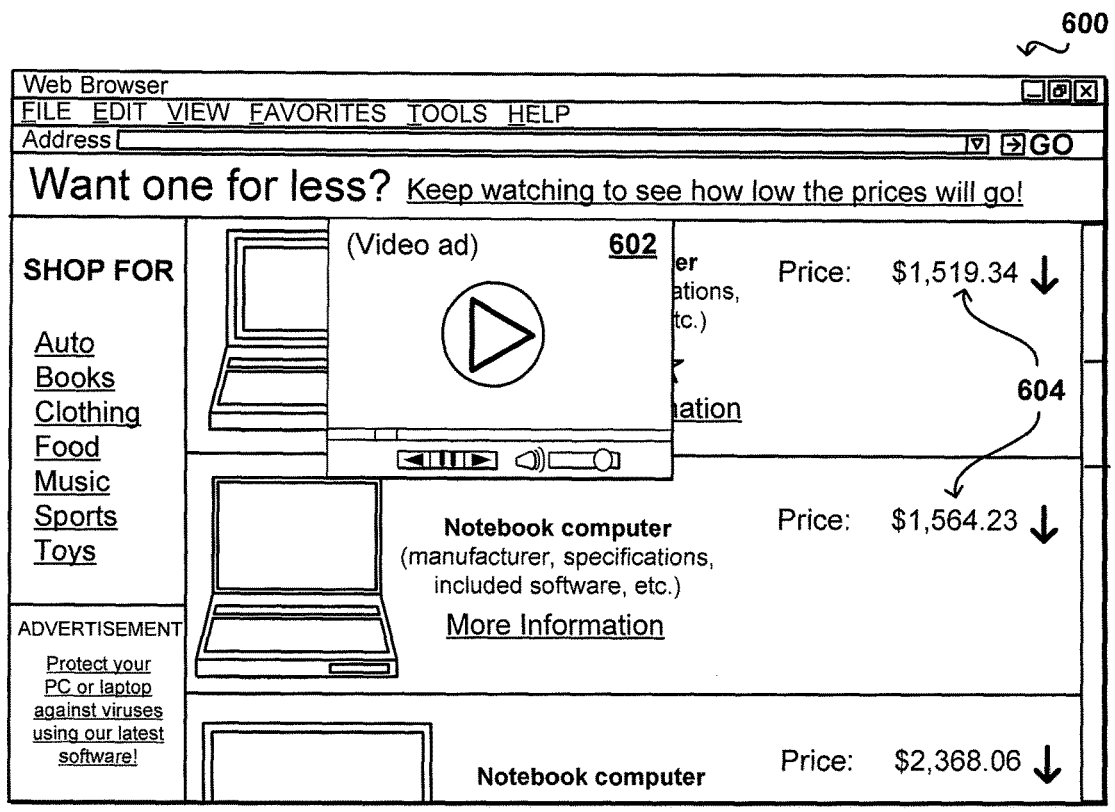
FIG. 6 illustrates an example interface showing a price reduction for multiple items in accordance with one embodiment.

Systems and methods in accordance with various embodiments can utilize the presentation of advertising in a number of other ways in order to increase revenue, or for other such purposes. For example, the display 600 of FIG. 6 illustrates that a video ad 602 can be displayed on a results page, such as a results page for a specific category or a results page shown in response to a user-submitted query. In this case, a customer might be presented with the option to view the video ad to reduce a price of at least some of the items on the results page. In the example shown, which corresponds to a category of notebook computers, the video might enable the customer to obtain a lower price on each item displayed for that category. The amount of the reduction can vary by item, and in some cases might only reduce by a few cents (comparable to the amount the retailer might get from the customer viewing the ad). Such an approach can allow the reduction to apply to all items. In other embodiments, the price will only be reduced for items that are "flagged" or otherwise qualify for a reduction. A customer then can be provided with the ability to sort the results by the reduced price. In some embodiments, a customer also can be able to filter the results or items displayed on a page by those items that qualify for a reduction. As can be seen, the prices 604 for each item can be shown to drop at the same or different rates during playing of the video, or presentation of the ad. In some embodiments, the results can automatically re-sort based on the changing prices.

Figure 7:
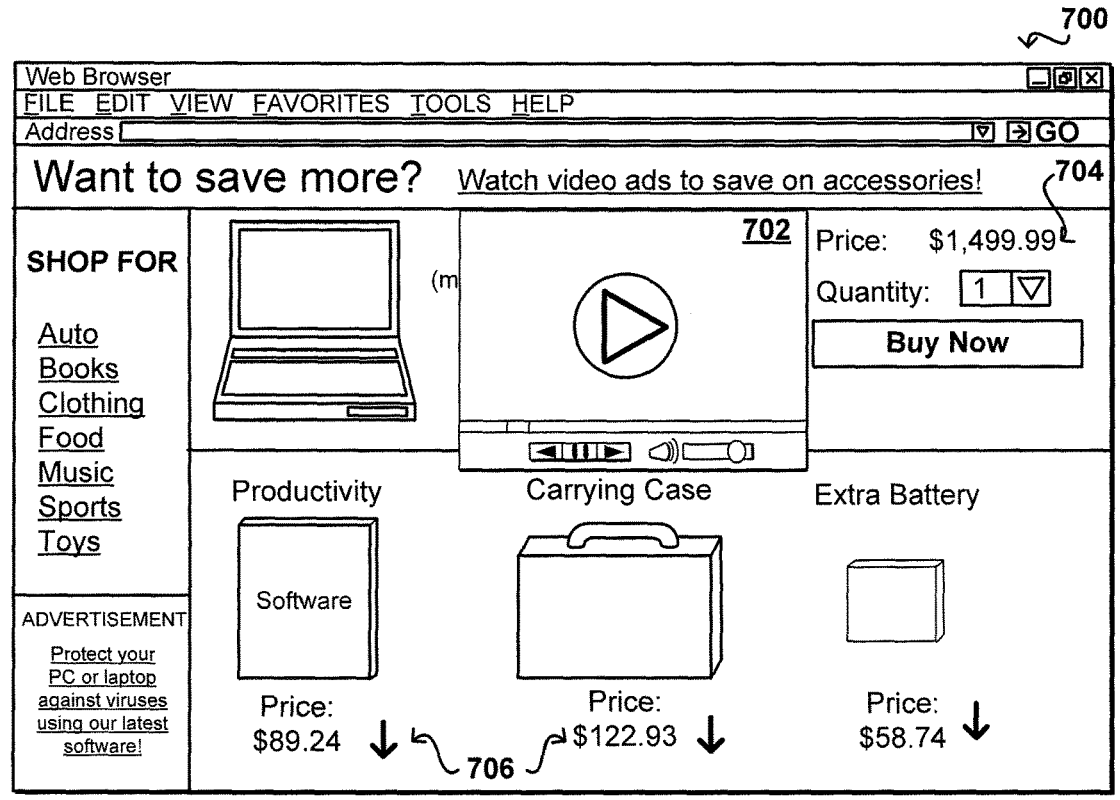
FIG. 7 illustrates an example interface showing a price reduction for accessories for an item in accordance with one embodiment.

FIG. 7 illustrates a display 700 in accordance with another embodiment, wherein the price of the item being viewed does not actually change with a presentation of the advertisement. In some cases, a retailer might want to actually advertise the lowest price in order to drive customers to the site. For example, price comparison sites might list only the advertised price, such that if the retailer lists the higher price then customers will be likely to visit a competing site. In one embodiment, a retailer can instead offer the ability for a customer to reduce prices on accessories or other items in response to viewing the presentation. In this example, the standard or "everyday" price 704 of an item is shown. If the customer selects to view an ad 702, the prices 706 of other items can be shown to drop as the customer views the presentation. The items to be displayed can be selected using any appropriate criteria, such as relatedness to the item being viewed, profitability, customer history information, etc. In some cases, the lower prices for each accessory can result in a profit that at least offsets any loss on the main item, and in some cases are selected such that the overall transaction will result in a profit if the customer selects an accessory or other such item. In other cases, the items displayed might be selected for being highly likely to be purchased by the customer, based on any appropriate historical or preference information, in order to increase the likelihood of an additional purchase. As discussed with respect to the multiple items above, the prices of each of the accessories can drop at different rates, and by different amounts. In some cases, the selection of accessories shown might even change as the percentage of savings changes during the presentation.

Figure 8:
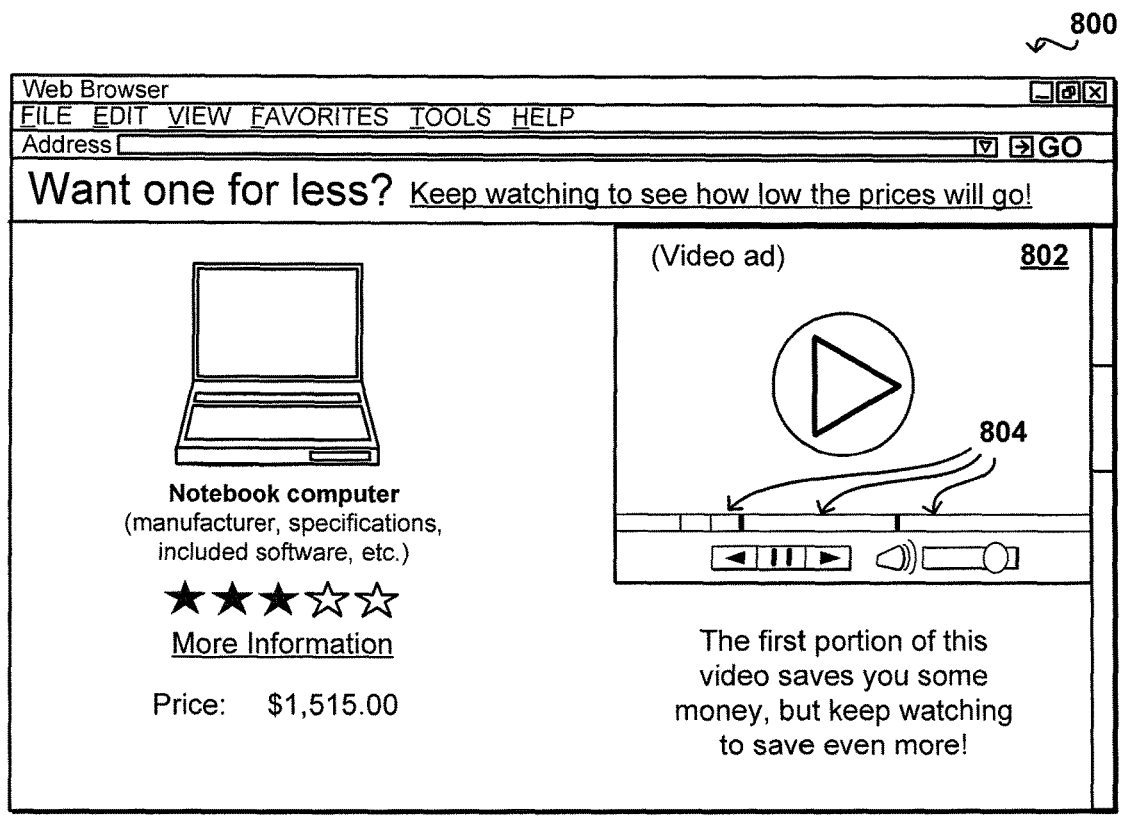
FIG. 8 illustrates an example interface showing a segmented video ad in accordance with one embodiment.

In some cases, an ad presentation might be relatively long, or might contain multiple distinct portions. For example, if a flash-type game is presented, then multiple rounds might be included in the game. If a video ad is displayed, the ad might include portions for distinct products or features. In such cases, the presentation might be segmented or otherwise delineated such that a customer receives a certain discount for each portion that the customer accesses. For example, FIG. 8 illustrates a display 800 where a video ad 802 includes several distinct portions 804, which are indicated at least by segment dividers in the "transport" or progress indicator bar in the video player. The display can include appropriate information for the customer, such as indicating how much a customer saves, or the reduced price, for each segment, and indicating that the customer can save more by accessing additional portions. For example, a customer might access a game that asks trivia questions about a company's products, in order to information the customer about that company's line of products. A customer might save ten cents for each round of questions. If a customer wants to stop after a couple of rounds, the customer might be happy saving twenty cents. Other customers can continue to play all the rounds in order to receive the full discount.

Figure 9:
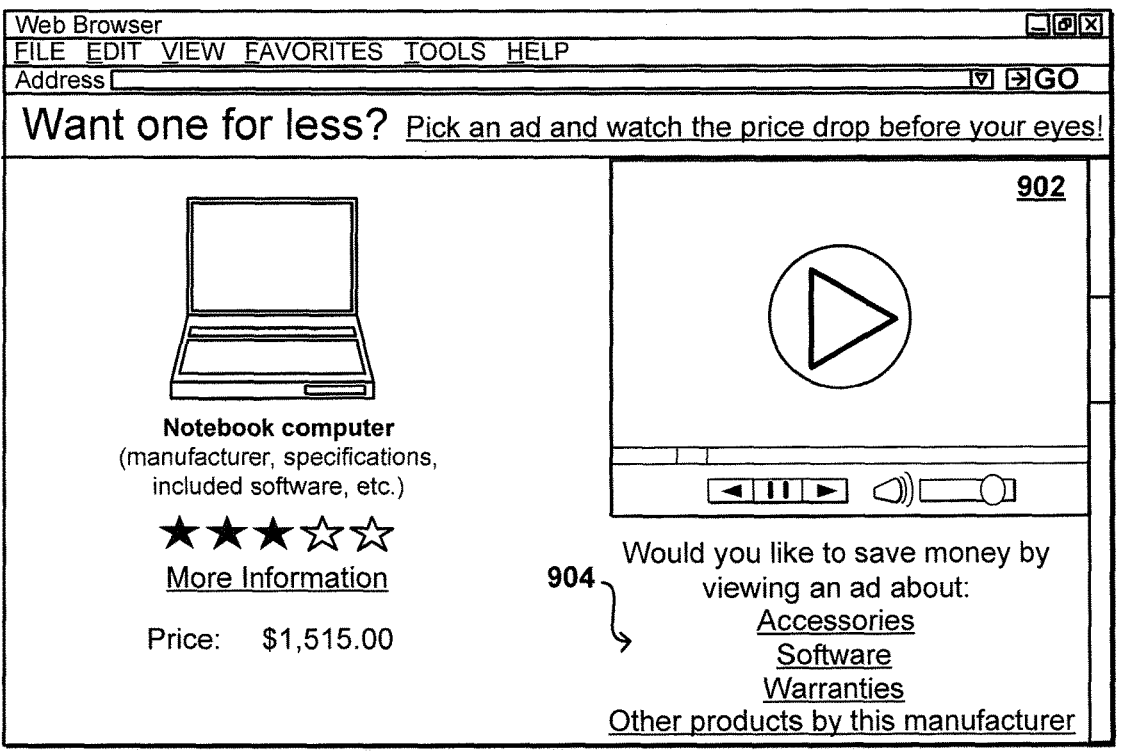
FIG. 9 illustrates an example interface showing selectable video segments in accordance with one embodiment.

Similarly, a customer might want to view only a portion of the video, and receive only a portion of the possible discount. If using a transport or slider bar as in FIG. 8, a customer would have to "skip" through the ad to determine the type of content at various points in the presentation. Such an approach can not only be undesirable as the experience may not be optimal for the customer, but the advertiser generally will want to prevent the customer from "fast forwarding" through the ad in order to obtain the discount without actually viewing the ad. FIG. 9 illustrates an example of a display 900 that can be presented to a customer in such a situation. In this example, several options 904 are provided to a customer that each indicate the content of various portions of the video 902. In this way, the customer can have the option of only viewing those portions that are of interest to the customer. In some cases, the customer will earn that portion of the possible discount that is reflected by the portion of the video watched. In other embodiments, a customer might be able to get the full discount by watching a specified number of the segments, which can be less than the full video. Various other options can be presented as well that utilize the various segments.

Figure 10:
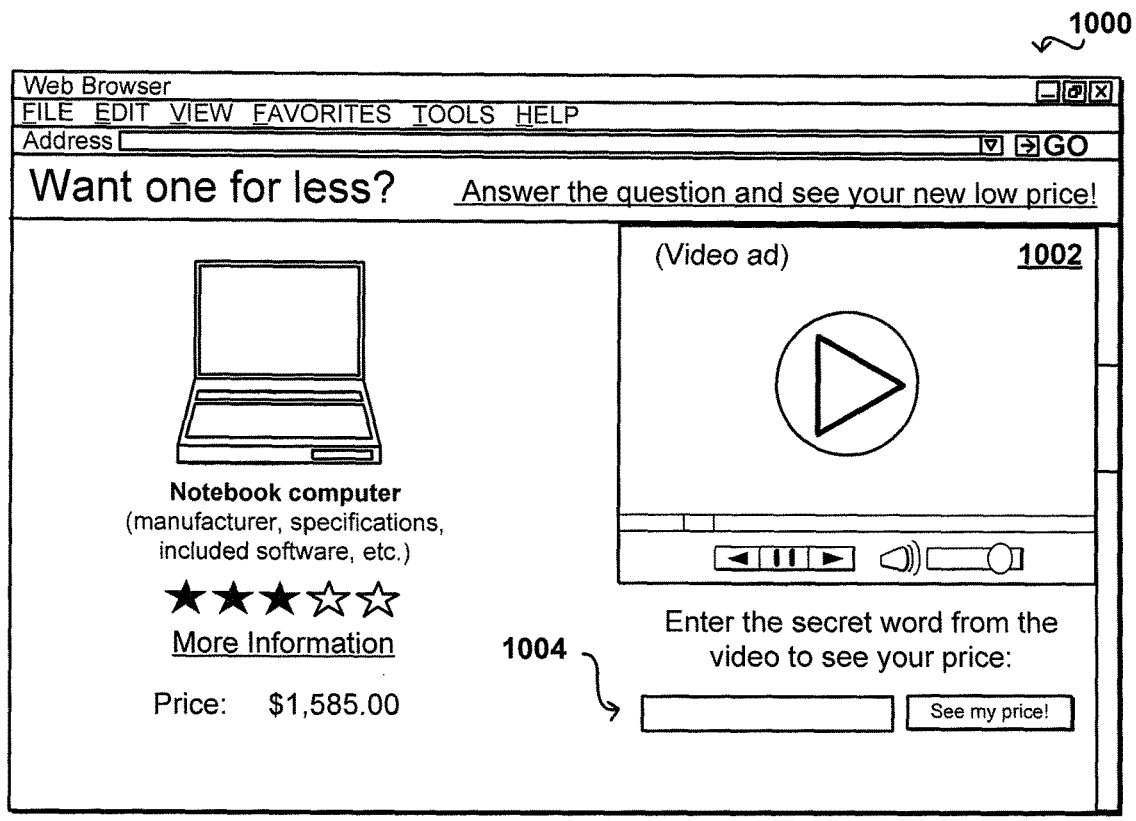
FIG. 10 illustrates an example interface showing a customer question in accordance with one embodiment.

As discussed, an advertiser or content provider in some embodiments might not want to offer the discount unless the customer actually pays attention to the advertisement (instead of just selecting the ad and doing something else until the presentation has been completed). If the ad is an interactive experience, such as a flash game, then the ad can be designed to require customer involvement (such as to periodically select certain features, etc.) As discussed, a video ad can be segmented such that the customer has to physically start each segment in order to view the full video and qualify for the lowest price. FIG. 10 illustrates another example display 1000, wherein the customer is asked to input something from the presentation 1002 in order to qualify for the discount. In this example, the customer is asked to input a "secret word" that was given during the presentation into a text box 1004 or other such field or element. While this can be desirable from an advertiser standpoint, it may not provide an optimal user experience. Further, if a customer actually watches most of the ad but for some reason misses the secret word, the customer might become upset if the customer is forced to sit through the ad again to obtain the word to qualify for the discount. The customer then might not only go to another site or location to purchase the item, but may not return to the electronic marketplace. In some embodiments, this field only appears after presentation of the video, in order to prevent customers from obtaining the secret word from electronic billboards or other locations and simply entering the secret word to get the discount. In some embodiments, the secret word is generated dynamically, or rotates, such that the customer has to watch the video in order to know which word to enter, even if the words are available from other sources.

Figure 11:
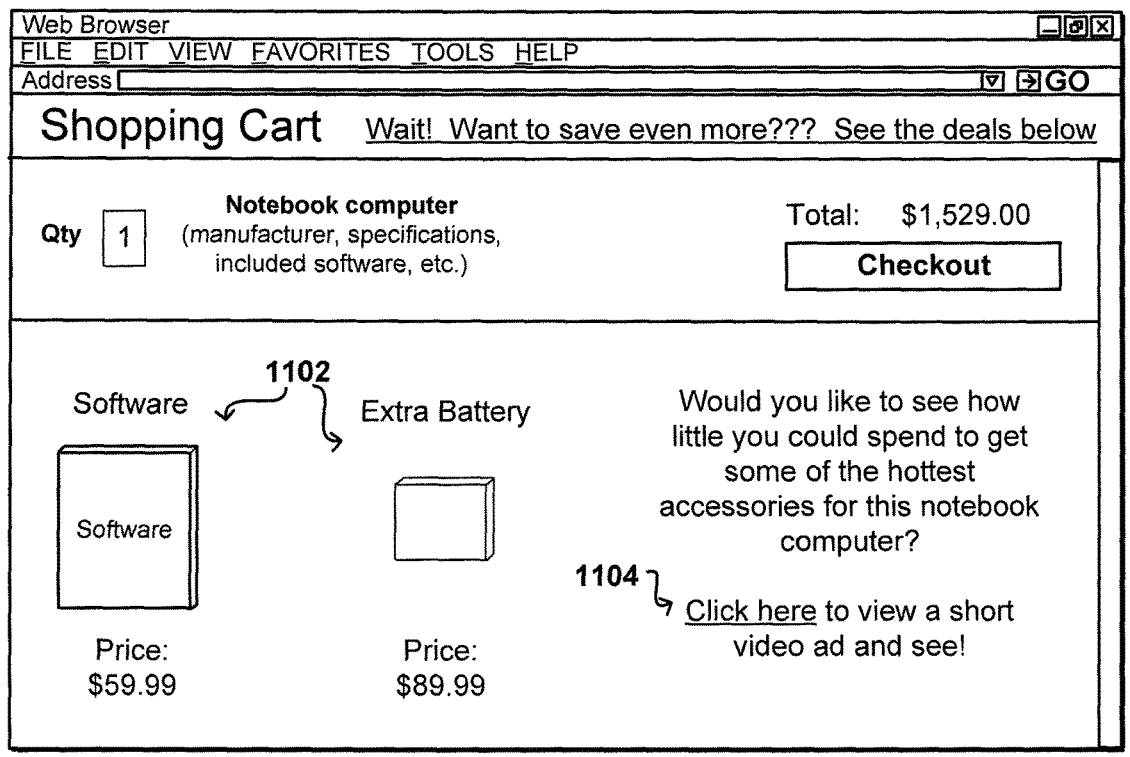
FIG. 11 illustrates an example interface showing an ad offer in a checkout process in accordance with one embodiment.

In addition to locations such as detail and results pages, such functionality can be advantageously provided in other locations as well. For example, FIG. 11 illustrates an example display 1100 wherein a customer is presented with accessories 1102 or other items at the time of checkout or purchase, such as when a customer accesses a virtual shopping cart. These additional items may be related to items in the cart, items that may be of interest to the customer based on historical information or purchasing history, promotional items, or any other appropriate items. At this point, a determination can be made as to the overall profitability of the transaction to be completed. If the transaction does not meet a threshold of profitability, or other such criteria, the customer can be presented with an option to view an ad presentation in order to save on accessories or other items if purchased. These discounts can be offered at other locations in the site, in order to avoid problems with price discrimination, but the decision as to whether to display additional items and/or which items to display can depend at least in part upon the determined profitability and/or other such factors. For example, if the item in the customer's shopping cart results in a significant loss of revenue, then items can be selected that are more profitable, even after any discount. If the item has little or no loss associated, then the items displayed can be those that are most likely to be purchased by the customer, based on historical or other such information, even if the profitability of each of the additional items is relatively less. In this embodiment, the customer can select an option 1104 to view an ad to watch the price of all the selected accessories drop, although in other embodiments a customer might be able to select an ad to reduce the price of a specific item, which can then adjust the ad that is displayed to the customer.

When the transaction is determined to be a relatively high profit transaction, the system can discourage the friction of ads and not offer the discount again in the cart if the customer could have received the discount on the detail page for an item (or other such location). For low to negative profit transactions, the friction of ads could be encouraged, and the opportunity to view the ads can be presented in multiple locations. The system can track the predicted profitability based on items in a customer's cart. For example, if a determined profitability for items in a customer's cart is low, then the customer might have ads presented on results pages in addition to detail pages. A customer might also have ads for accessories on a detail page, which otherwise might only be displayed on the detail page for each of those accessories. Multiple ads with multiple possible discounts can be displayed on a single page, the number, selection, and arrangement being based upon factors such as predicted profitability and customer information. As long as the discounts are similarly available for any customer, the selection and placement of the advertisements should not run afoul of price discrimination policies. A safe practice in accordance with one embodiment would be to always include the ad on a detail page for an item, such that any customer can get the lower price by accessing the page for the item. Such a system can, however, also offer the ads in other locations such as results pages and in shopping carts, and can place additional ads or possible discounts on these pages, based upon factors such as those discussed and suggested herein.

In some cases, a system might also display an ad on an order confirmation page, or other page presented to a customer after a transaction. For example, if it is determined that little or no profit was made on a transaction, the system can display an ad on the confirmation page that offers the customer a discount on one or more items that might be related to any items that were included in the transaction. In such an example, the customer could watch the ad and then be able to add the item(s) at the reduced price to a virtual shopping cart or other such location for subsequent purchase. In this way, any loss or reduction in profit of the present transaction can be offset by both the revenue from the ad and the subsequent purchase of the additional item.

As discussed above, customers in some embodiments can be offered the ability to subscribe to, or otherwise join, various programs or memberships that may entitle the customer to receive reduced prices by watching or participating in various advertising campaigns. For example, an electronic marketplace can offer a "Savers Club" or similar membership program where customers can sign up to have the option to view ads, where available, to receive a lower price. In other cases where customers might already belong to a program, such as a program that offers unlimited free shipping for a flat yearly fee, the cost of that membership might be reduced if the customer is willing to view video or similar ads. In some cases, signing up for such programs can cause the ads to run automatically when the customer signs in to a particular page. In some programs, the customer may receive a lower cost for a membership if the customer agrees to watch a minimum amount of advertising, and will continue to receive the lower cost as long as the customer keeps reaching the minimum.

Figure 12:
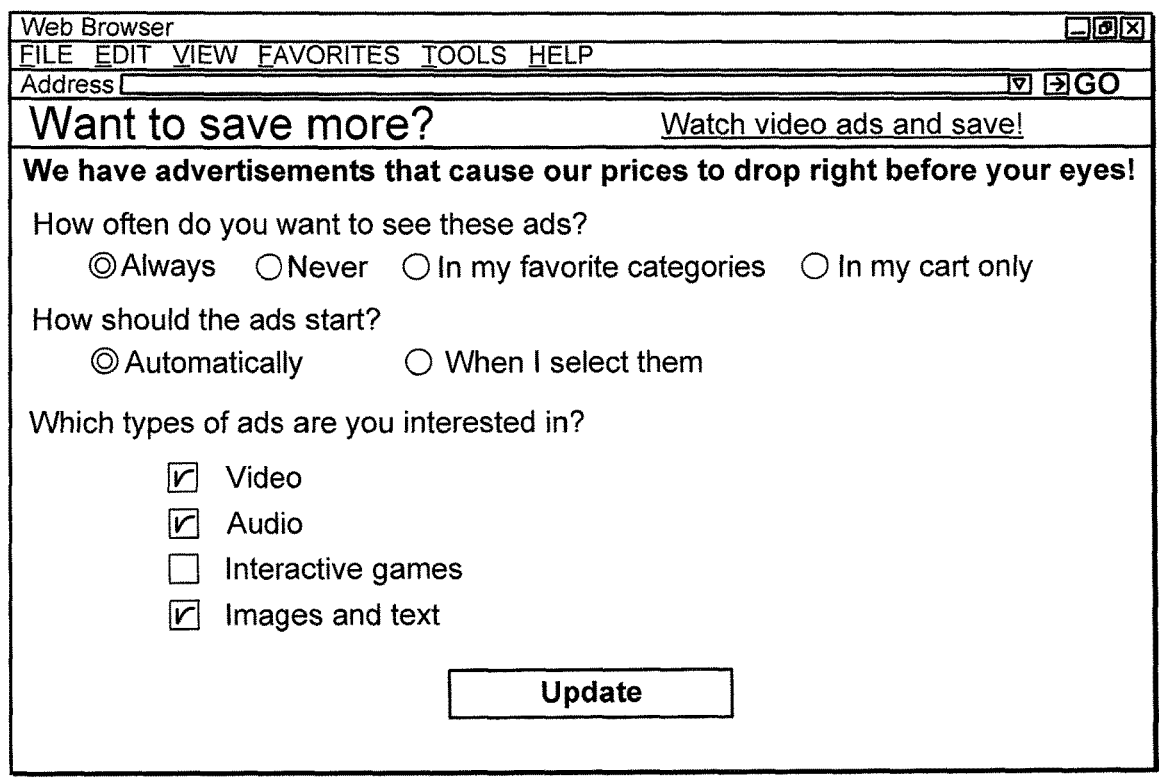
FIG. 12 illustrates an example interface enabling a customer to configure advertising options that can be used in accordance with one embodiment.

Customers in some embodiments are able to configure the numbers and types of such ads that are shown. For example, FIG. 12 illustrates an example display 1200 which allows customers to configure aspects of the advertising to be presented to the customer. In this example, the customer is able to select when the customer wants to see ads, such as whenever the ads are available for a page that the customer is viewing, only for certain categories, or not on any pages presented to the customer. The customer also can have other options, such as to only display ads to the customer during a checkout or similar process, instead of on each individual page. Such an option can allow the customer to access the deals, while minimizing the amount of time that the customer has to spend on the site. A customer also can select an option that specifies how ads should start, such as automatically or only when selected by a customer. The customer also can select which types of ads the customer should receive, such as video, audio, interactive, or flash-type ads. For example, a customer might have a relatively slow network connection and may not want to view streaming video. Various other combinations, options, and alternatives can be configurable as well as would be apparent to one of ordinary skill in the art in light of the teachings and suggestions contained herein. Further, such options might not be available to all customers, but might be available only to customers who opt in to an advertising campaign, etc.

In some embodiments, a short video advertisement might automatically play when a customer accesses a particular page. The short advertisement can indicate to a customer that the customer can get a better price on an item if the customer watches a subsequent video. In some cases the customer will not save any money by watching the short introductory video, while in other cases the price of the item on the page being viewed might drop a certain amount so the customer can see how viewing the ads affects the prices. For example, during the introductory advertisement a price might drop by $0.50, and the advertisement can indicate a message such as "You just saved fifty cents by watching this ad—want to save more?" The provider in this way can get almost 100% ad impressions for a page view, with potential for additional impressions as customers select to watch additional advertisements. In this way, an ad impression is obtained for each customer whether or not the customer actually makes a purchase. Information (e.g., a Web cookie) can be stored on the customer's computer, for example, which can enable the video introduction to only be displayed once to a customer, or at any other appropriate time, such as once per visit to the site. For example, a Web site or server can request a cookie from a user's computer, which will identify the user, computer, session, or other such information. The system then can use this information to determine information such as the last time the user visited the site, a specific page, etc. If the user or client device has not visited a page on the site in the last twenty-four hours, or has not previously visited the page, for example, then the video may be shown. The introductory ad also can be tracked by username or other appropriate information. In certain cases, there may be different introductory ads by category, type of ad, etc., that can each be displayed to a customer. In some embodiments, a customer can be presented with an option to opt in, or opt out, of viewing particular types of ads after viewing the introductory ad. In other cases, the introductory ad will automatically be shown once to a customer, and the options to view ads will be displayed on subsequent pages but left to the customer to select.

As discussed, appropriate ads can be selected to be displayed on a page for an item, group of items, category, type of content, or other such type or grouping of information. For example, if a customer is viewing a detail page for an item, the ad might relate to that item in order to entice the customer to buy the item, or might relate to the item in some way, such as advertising accessories, related services, etc. In other cases, the advertisement might be for an item in a same category (e.g., electronics or books) or might be for another item from the same manufacturer. In some embodiments, when there is no directly related ad to be shown, the ad to be displayed can be selected based on information such as customer interests, past customer purchases, recommendations, previously-viewed items, popular items, or any other appropriate criteria.

Electronic merchants or other content providers also can utilize such advertisements on other sites or locations. For example, an ad can be submitted to an associate, search engine, or other such provider, which displays an ad for an item at a first price. The ad can indicate that a customer can get a lower price by watching a video ad, for example. If the customer clicks on or otherwise selects to view the video, the video can be displayed to the customer through the provider site (e.g., in a frame or popup window), and after viewing at least a portion of the video the customer can see the lower price that is being offered. In some cases, as part of the video or as a separate element, the customer also can see the price drop as a result of viewing the advertisement. The customer then could be directed to a detail page or other location to purchase the item at that price. In such an embodiment, the number of customers viewing the ad will outnumber the number of customers who follow the ad, such that additional revenue will be generated.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
displaying, using information from at least one server, a page of the information for an item in response to a request from a user, the information including a first price for the item;
determining an anticipated value for the item;
determining, by a one or more processors and in dynamic response to the request, advertising content relating to the item and configured for display over a first period of time;
determining, by the one or more processors, a sequential price reduction applicable to the item, the sequential price reduction associated with a determined number of second periods of time within the first period of time;
displaying a dynamic user interface in the determined number of second periods of time when the anticipated value falls below a specified value threshold, the dynamic user interface including the advertising content and a dynamically changing price, the dynamically changing price being associated with the sequential price reduction in the determined number of second periods of time;
displaying the first price at the beginning of the first period of time;
for the determined number of second periods of time and along with the display of the advertising content for the first period of time, displaying the dynamically changing price and including a hyperlink to secure the item after at least one second period of time, wherein item is secured when the hyperlink is activated in the at least one second period of time; and
completing a transaction for securing the item via the dynamic user interface.

2. The computer-implemented method of claim 1, further comprising:
displaying the advertising content before providing an option to receive the advertising content, wherein the advertising content includes explanation of the sequential price reduction from the first price.

3. A computer-implemented method, comprising:
displaying, using information from at least one server, a page of the information relating to at least one item, the information including a first price for the at least one item;
determining an anticipated value for the at least one item;
determining, by one or more processors and in dynamic response to the request, content relating to the at least one item and configured for display over a first period of time;
determining, by the one or more processors, a sequential price reduction applicable to the at least one item, the sequential price reduction associated with a determined number of second periods of time within the first period of time;
displaying a dynamic user interface in the determined number of second periods of time when the anticipated value falls below a specified value threshold, the dynamic user interface including the content and a dynamically changing price, the dynamically changing price being associated with the sequential price reduction in the determined number of the second periods of time;
displaying the first price at the beginning of the first period of time;
for the second periods of time and along with the display of the content for the first period of time, displaying the dynamically changing price and including a hyperlink to secure the at least one item after at least one second period of time, wherein the at least one item is secured when the hyperlink is activated in the at least one second period of time;
completing a transaction for securing the at least one item via the dynamic user interface.

4. The computer-implemented method of claim 3, wherein a lowest price for the at least one item is displayed upon receiving the content in its entirety over the first period of time.

5. The computer-implemented method of claim 3, wherein the sequential price reduction for the first price is proportional to an amount of the content that is displayed.

6. The computer-implemented method of claim 3, further comprising:
displaying an option to receive the content prior to displaying the content.

7. The computer-implemented method of claim 3, further comprising:
determining that the information from the at least one server is for a group that is qualified to receive the supplemental content.

8. The computer-implemented method of claim 3, wherein the content is based on at least one of an aspect of the at least one item or a user associated with the computer-implemented method.

9. The computer-implemented method of claim 3, wherein providing an option to receive the content as part of a promotion for the at least one item.

10. The computer-implemented method of claim 3, further comprising:
when multiple items are displayed on the page, the sequential price reduction is applicable to at least two of the multiple items during the displaying of the content, the sequential price reduction performed for at least one of: different rates and different amounts.

11. The computer-implemented method of claim 3, wherein:
the content includes multiple portions; and the sequential price reduction of the at least one item corresponds to one of the multiple portions presented to the user.

12. The computer-implemented method of claim 11, wherein:
each of the multiple portions is available for selection for the displaying in the dynamic user interface.

13. The computer-implemented method of claim 3, wherein:
the content includes at least one of an audio presentation, a video presentation, an interactive presentation, and a gaming presentation.

14. A computer-implemented method, comprising:
displaying, using information from a least one server, a page of information for a first item, including a first price for the first item;
determining a profitability for a transaction of the first item and any additional items;
determining, by one or more processors and in dynamic response to the request, advertising content relating to the first item and configured for display over a first period of time;
determining, by the one or more processors, a sequential price reduction applicable to the first item, the sequential price reduction associated with a determined number of second periods of time within the first period of time;
displaying a dynamic user interface in the determined number of second periods of time when the determined profitability falls below a profitability threshold, the dynamic user interface including the advertising content and a dynamically changing price, the dynamically changing price being associated with the sequential price reduction in the determined number of the second periods of time;
displaying the first price at the beginning of the first period of time;
for the second periods of time and along with the display of the advertising content for the first period of time, displaying the dynamically changing price and including a hyperlink to secure the first item after at least one second period of time, wherein the first item is secured when the hyperlink is activated in the at least one second period of time;
completing a transaction for securing the first item via the dynamic user interface.

15. The computer-implemented method of claim 14, wherein:
at least one of the additional items is related to the first item.

16. The computer-implemented method of claim 14, wherein:
displaying an option to receive the advertising content during a checkout stage before the sequential price reduction.

17. The computer-implemented method of claim 14, wherein:
the advertising content is advertising relating to a user associated with the computer-implemented method and with the first item.

18. A system, comprising:
a processor; and
a memory device including instructions that, when executed by the processor, cause the system to:
display a page of information in response to a request from a dynamic user interface;
determine an anticipated profitability of an item of the page of information when the item is sold at a first price;
determine, in dynamic response to the request, advertising content relating to the item and configured for display over a first period of time;
determine a sequential price reduction applicable to the item, the sequential price reduction associated with a determined number of second periods of time within the first period of time;
display the dynamic user interface in the determined number of second periods of time when the anticipated value falls below a specified value threshold the dynamic user interface including the advertising content and a dynamically changing price, the dynamically changing price being associated with the sequential price reduction in the determined number of second periods of time; and
displaying the first price at the beginning of the first period of time;
for the determined number of second periods of time and along with the display of the advertising content for the first period of time, displaying the dynamically changing price and including a hyperlink to secure the item after at least one second period of time, wherein item is secured when the hyperlink is activated in the at least one second period of time; and
complete a transaction for securing the item, via the dynamic user interface.

19. The system according to claim 18, wherein:
a price after at least one of the sequential price reduction is a lowest price for the item.

20. A computer program product embedded in a non-transitory computer readable medium and including instructions that, when executed by a computing device, cause the computing device to:
display a page of information comprising an item in response to a request from a dynamic user interface;
determine an anticipated profitability of the item when the item is sold at a first price;
determine, in dynamic response to the request, advertising content relating to the item and configured for display over a first period of time;
determine a sequential price reduction applicable to the item, the sequential price reduction associated with a determined number of second periods of time within the first period of time;
display the dynamic user interface in the determined number of second periods of time when the anticipated value falls below a specified value threshold the dynamic user interface including the advertising content and a dynamically changing price, the dynamically changing price being associated with the sequential price reduction in the determined number of second periods of time;
display the first price at the beginning of the first period of time;
for the determined number of second periods of time and along with the display of the advertising content for the first period of time, displaying the dynamically changing price and including a hyperlink to secure the item after at least one second period of time, wherein item is secured when the hyperlink is activated in the at least one second period of time; and
complete a transaction for securing the item, via the dynamic user interface.

21. The computer program product according to claim 20, wherein:
   a price after at least one of the sequential price reduction is a lowest price for the item.

* * * * *